United States Patent [19]

Crawford et al.

[11] Patent Number: 5,128,698
[45] Date of Patent: Jul. 7, 1992

[54] BOLDNESS CONTROL IN AN ELECTROPHOTOGRAPHIC MACHINE

[75] Inventors: Jack L. Crawford, Boulder; Joseph E. Cunningham, Jr., Lafayette, both of Colo.

[73] Assignee: International Business Machines Corporation, Armonk, N.Y.

[21] Appl. No.: 467,713

[22] Filed: Jan. 19, 1990

[51] Int. Cl.$^5$ .............................................. G01D 15/14
[52] U.S. Cl. ..................................... 346/160; 346/108; 346/1.1; 358/448; 358/452; 358/475
[58] Field of Search ..................... 346/153.1, 154, 155, 346/160, 107 R, 108, 1.1; 358/448, 452, 475

[56] References Cited

U.S. PATENT DOCUMENTS

| | | | |
|---|---|---|---|
| 4,122,409 | 10/1978 | Marlett et al. | 331/94.5 M |
| 4,395,721 | 7/1983 | Ohno et al. | 346/160 |
| 4,396,928 | 8/1983 | Abe et al. | 346/160 |
| 4,437,122 | 3/1984 | Walsh et al. | 358/166 |
| 4,460,909 | 7/1984 | Bassetti et al. | 346/160 |
| 4,476,474 | 10/1984 | Kitamura | 346/160 |
| 4,544,264 | 10/1985 | Bassetti et al. | 355/14 R |
| 4,625,222 | 11/1986 | Bassetti et al. | 346/160 |
| 4,681,424 | 7/1987 | Kantor et al. | 355/14 R |
| 4,700,201 | 10/1987 | Sato | 346/108 |
| 4,814,886 | 3/1989 | Kuge et al. | 358/293 |
| 4,821,065 | 4/1989 | Ishii et al. | 355/14 E |
| 4,831,395 | 5/1989 | Pham et al. | 346/160 |
| 4,864,216 | 9/1989 | Kalata et al. | 346/108 X |
| 4,876,610 | 10/1989 | Ohsawa et al. | 358/443 |
| 4,878,072 | 10/1989 | Reinten | 346/154 |
| 4,885,597 | 12/1989 | Tachang et al. | 346/160 X |
| 4,905,023 | 2/1990 | Suzuki | 346/160 |
| 4,914,459 | 3/1990 | Mama et al. | 346/160 |
| 4,980,778 | 12/1990 | Wittman | 358/475 X |
| 4,992,804 | 2/1991 | Roe | 346/108 |

FOREIGN PATENT DOCUMENTS

| | | | |
|---|---|---|---|
| 0094875 | 7/1981 | Japan | 358/448 |
| 0129481 | 10/1981 | Japan | 358/448 |

OTHER PUBLICATIONS

Article "Fidelity Control of Electrophotographic Print Process" by J. L. Crawford Presented at SPSE/SPIE Symposium On Electronic Imaging, 9 pages Jun. 15, 1989.

Primary Examiner—Benjamin R. Fuller
Assistant Examiner—Randy W. Gibson
Attorney, Agent, or Firm—Charles E. Rohrer

[57] ABSTRACT

Control over the placement of image edge location on the photoconductor of an electrophotographic machine providing for a range of discharge levels for edge picture elements (PELS) which vary from greater than, to less than, that level used for fully discharged PELS. Such control is achieved independently of machine parameter control by altering edge PEL illumination intensity in accordance with data representing desired edge PEL intensity as the photoconductor sensitivity changes. A system for measuring and controlling the fully discharged PEL level establishes a measurre of photoconductor sensitivity and is used for enabling the selection of current edge PEL intensity.

8 Claims, 4 Drawing Sheets

| WHITE VOLTAGE (VOLTS) | NUMBER OF WHITE DRIVERS | WHITE POWER LEVEL | NUMBER OF EDGE DRIVERS | EDGE POWER LEVEL |
|---|---|---|---|---|
| 200 | 9 | 30-47 | 19 | 64-100 |
| 200 | 9 | 48-75 | 12 | 64-100 |
| 200 | 9 | 76-100 | 9 | 76-100 |
| 200 | 19 | 101-158 | 12 | 64-100 |
| 200 | 19 | 159-211 | 9 | 75-100 |
| 200 | 19 | 212-255 | 7 | 78-94 |

FIG. 3.

| WHITE VOLTAGE (VOLTS) | NUMBER OF WHITE DRIVERS | WHITE POWER LEVEL | NUMBER OF EDGE DRIVERS | EDGE POWER LEVEL |
|---|---|---|---|---|
| 200 | 3 | 25-33 | 9 | 75-100 |
| 200 | 4 | 34-44 | 9 | 75-100 |
| 200 | 5 | 45-55 | 9 | 80-100 |
| 200 | 7 | 56-78 | 9 | 71-100 |
| 200 | 9 | 79-100 | 9 | 78-100 |
| 200 | 12 | 101-133 | 9 | 75-100 |
| 200 | 19 | 134-211 | 9 | 63-100 |

FIG. 4.

BOLDNESS CONTROL IN AN ELECTROPHOTOGRAPHIC MACHINE

This invention relates to electrophotographic printing machines, such as a laser or a light-emitting diode (LED) printer, and more specifically relates to a system for controlling image boldness independently of control over the electrophotographic process.

BACKGROUND OF THE INVENTION

In an electrophotographic printing machine, an image to be printed is produced on photosensitive material. The image may be comprised of text, line drawings, photographs, bar codes, or any combination of those data types. Light for exposing the electrically-charged photosensitive material may originate from a laser source, an LED source or any other suitable light source. Light modulating means are used to change light power levels or the time duration of exposure in order to produce variations in the charge level on the photosensitive material to reflect the charge level of voltage needed to reproduce the desired image.

After the desired image is reproduced on the photosensitive material, it is passed into a developer and then transferred to image-receiving material, for example, paper. The developing material is then fused into the paper for production of a completed print.

In order to continually produce a succession of satisfactory prints, it is desirable to adjust and readjust the parameters of the electrophotographic process to their optimum levels. For example, a specific charge level must be chosen to charge the photoconductor adequately prior to exposure. Since many types of photosensitive material (photoconductor) cannot be discharged to zero volts through exposure, a specific charge level, which will represent a satisfactory fully -discharged image level, should be chosen. Voltage levels for the developer should be set together with appropriate levels for all light producing mediums. Once all these parameters are adjusted, they need to be continually monitored as the printer is used since print quality may degrade significantly as the photoconductor ages, or as heat, humidity and other environmental conditions affect the machine.

One of the problems facing machine designers is setting process parameters to a level that protects the boldness of printed material. That is, under certain circumstances, operating parameters which are optimized for producing solid black on a white background, may produce printing which is too bold (i.e., the white "hole" in a P may be obliterated), or printing which is not bold enough (i.e., narrow lines become invisible).

It is an object of this invention to achieve control over print boldness which is independent of the setting of machine parameters so that those parameters can be adjusted to compensate for the aging of photoconductor and other environmental conditions within a machine without affecting the boldness quality which the user desires.

Another object is to provide a system in which the user can adjust print boldness to a desired level (that is, through a range of boldness levels), and that adjustment is obtained without affecting the settings of machine parameters.

To achieve the objects of the invention, the inventors have recognized that photosensitive material is exposed by producing a succession of light spots, i.e., picture elements (PELS), which can vary in size. It is known that large spots are needed to prevent scan lines between spots, while small spots are needed to print fine details. Others have optimized spot size. This invention deals with setting and retaining the placement of image edge location by concentrating on retaining print fidelity. Fidelity refers to a true spatial reproduction of the printed PEL pattern for a given addressability and is most concerned with controlling the location of the printed edge. Edge location refers to all implied spatial consequences such as boldness, stroke width, dot size, and hole size. Fidelity control, as described in this invention, provides an independent control of print fidelity allowing improvements in print quality with greater latitude in the optimization of machine parameters. Edge PELS in this invention are defined as the discharged PELS directly adjacent to black edges. If a charged area development (CAD) process is in use, the edge PELS are those discharged PELS directly adjacent to the charged black PELS. In a discharged area development (DAD) process, the edge PEL is that discharged black PEL directly adjacent to a charged white PEL. This invention involves control of the exposure level of the edge PEL in order to produce control over the printed edge location.

U.S. Pat. No. 4,460,909 relates to enhancing the apparent resolution of an electrophotographic printer by writing grey PELS along the edges of slanted lines in order the smooth the digitization of the slanted line which might otherwise be visible.

U.S Pat. No 4,544,264 relates to broadening fine lines by adding small black areas to each edge of the fine line in order to broaden it, or in another dimension, broadening the fine lines by placing grey PELS next to black PELS.

U.S. Pat. No. 4,625,222 relates to the above two patents and provides means for improving print quality when the above two print enhancement techniques interact to degrade the resultant print.

U.S. Pat. No. 4,681,424 relates to providing environmental compensation, such as to modify the print data to broaden lines as needed.

U.S. Pat. Nos. 4,396,928 and 4,395,721 relate to systems for broadening scan lines so that adjacent scanning lines are partially superposed over each other.

U.S. Pat. No. 4,437,122 relates to a system for inspecting neighboring PELS in order to increase the density of the information elements to round off character edges and smooth diagonals.

U.S. Pat. No. 4,700,201 relates to a technique for altering the exposure of a PEL to control dot size in accordance with the value of neighboring PELS in order to achieve a smoother representation of halftones.

U.S. Pat. No. 4,122,409 relates to control over laser intensity by controlling the current level supplied to the laser.

U.S. Pat. No. 4,476,474 relates to the use of multiple laser beams to control spot size.

U.S. Pat. No. 4,821,065 relates to a system for controlling laser power in accordance with measurement of surface potential.

An article, "Fidelity Control of Electrophotographic Print Process" by J. L. Crawford, SPSE/SPIE Symposium on Electronic Imaging, Jan. 20, 1989, describes the science of the instant invention.

SUMMARY OF THE INVENTION

This invention provides for boldness control for an electrophotographic printing machine wherein the exposure of all edge PELS (that is, those discharged PELS directly adjacent to non-discharged PELS) is controlled to levels both greater than or less than that exposure level used to produce fully discharged PELS.

For example, in a charged area development process, the background area (i.e., the white area) is exposed. With new highly sensitive photoconductor, it may be necessary to expose the edge PELS to a level greater than that level used to produce the white background in order to prevent the charged area from growing into what should be white background area. These super white edge PELS have a negative effect on the edge voltage transition location (location of the black edge), to prevent shifting the edge and thus enabling the retention of proper image boldness. Conversely, when old, relatively insensitive photoconductor is in use, it may be necessary to reduce the exposure level of the edge PELS in order to prevent a reduction in the charged area. These sub-white edge PELS have a positive effect on the edge voltage transition location to prevent its shift and thus enable the retention of proper image boldness.

A printhead is provided with several levels of exposure intensity. With new, highly sensitive photoconductor, an exposure level is chosen which can provide the desired white voltage level on the photoconductor. As the sensitivity of the photoconductor changes with age, or as other environmental conditions cause the white voltage level to change, the exposure level is changed to keep the white voltage level constant With sensitive photoconductor, edge PELS are produced to a "super white" exposure intensity which is needed to control the location of edge transition. Thus, as photoconductor sensitivity degrades, the white PEL exposure level increases, while the edge PEL exposure level remains relatively constant. In that manner, the boldness of the print remains the same even though exposure levels have changed in the white background area.

The invention provides for boldness adjustment, that is, a range of boldness levels, by enabling an alteration of the edge PEL exposure level, thus altering the ratio of edge PEL exposure to white PEL exposure (CAD system), or the ratio of edge PEL exposure to black PEL exposure (DAD system).

BRIEF DESCRIPTION OF THE DRAWING

The above-mentioned objects and other features and objects of this invention, and the manner of attaining them will become more apparent and the invention itself will best be understood by reference to the following description of embodiments of the invention taken in conjunction with the accompanying drawing, the description of which follows.

FIG. 3 shows a table of values for use in the control unit of FIG. 2.

FIG. 4 is a second table of values for a second implementation.

DETAILED DESCRIPTION OF THE PREFERRED EMBODIMENT

In electrophotographic machines, prints are produced by creating an image of the subject on a photoreceptive surface, developing the image and then fusing it to paper or other print-receiving material. In most electrophotographic machines, the process is of the transfer type where photoreceptive material is placed around a rotating drum, or arranged as a belt to be driven by a system of rollers. In a typical transfer process, photoreceptive material is passed under a stationary charge generating station to place a relatively uniform electrostatic charge (usually several hundred volts) across the entirety of the photoreceptive surface Next, the photoreceptor is moved to an imaging station where it receives light rays from a light-generating source which discharges the photoreceptor to relatively low levels while the photoreceptor continues to carry high voltage levels when the light source is turned off or when it is powered at intermediate levels or for a relatively short duration In that manner, the photoreceptive material is caused to bear a charge pattern which corresponds to the printing, shading, etc., desired to be printed on the receiving material.

Light-generating sources in an electrophotographic printer are frequently comprised of lasing means in which the beam is modulated by a character generator to control the power or the length of time that a beam exposes the photoconductor in a particular PEL area. Similarly, in an LED electrophotographic printer, each LED is modulated to control the power or the length of time that each LED is energized in order to expose the photoconductor in particular PEL areas.

After producing an image on the photoreceptor, the image is moved to a developing station where developing material is placed on the image. This material is frequently in the form of a powder which carries a charge designed to cause the powder to deposit on selected areas of the photoreceptor.

The developed image is moved from the developer to a transfer station where the copy-receiving material (usually paper) is juxtaposed to the developed image, and a charge is placed on the backside of the paper so that when it is stripped from the photoreceptor, the toner material is held on the paper and removed from the photoreceptor.

The remaining process steps are for permanently bonding toner material to the copy paper, and cleaning residual toner left on the photoreceptor so that it can be reused.

Figure 1:
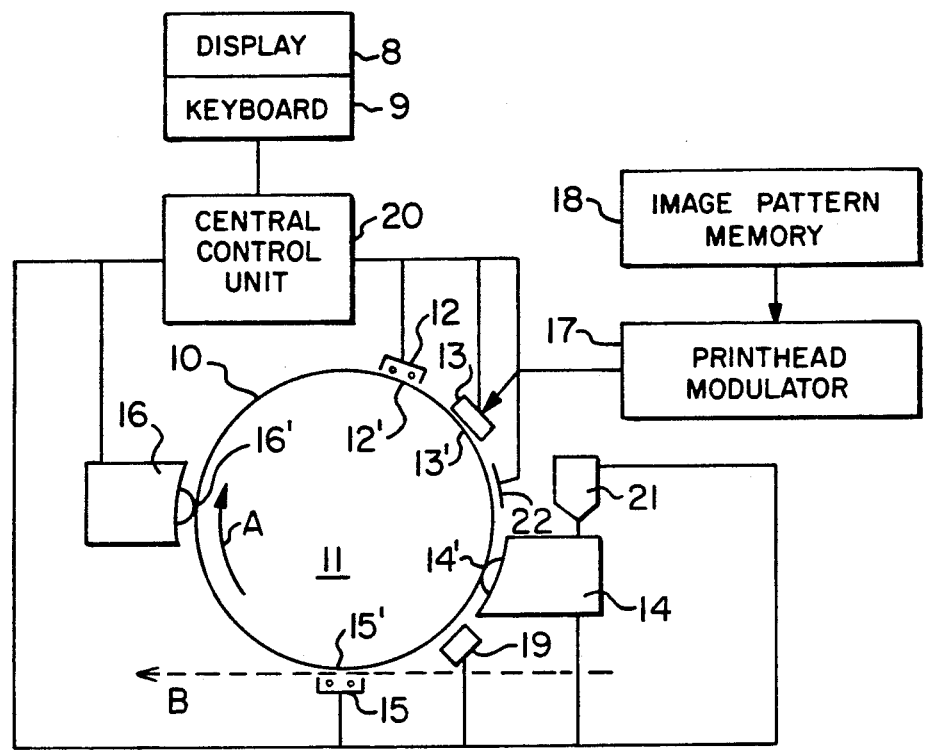
FIG. 1 shows a typical electrophotographic printing machine utilizing the instant invention.

FIG. 1 shows a typical electrophotographic machine such as would be used to implement this invention. Photoreceptive material 10 is placed on the surface of a drum 11 which is driven by motor means (not shown) to rotate in the direction A. A charge generator 12 places a uniform charge of several hundred volts across the surface of the photoreceptor at charging station 12'. The charged photoreceptor is mounted in a dark enclosure (not shown) and rotates to a printhead 13 which is comprised of a light-generating source, such as a laser generator. The light source selectively exposes the charged photoreceptor at imaging station 13' to discharge it in areas which are desired to be developed (discharged area development, DAD process), or discharge it in areas which are to remain free of toner (charged area development, CAD process).

For a CAD process, the discharged areas of the photoreceptor provide the white background, while the charged areas are developed at developing station 14' by developer apparatus 14 which applies toner so that the photoreceptor carries a visually perceptible image of the data. The developed image rotates to a transfer station 15' where print paper, moving in the direction B, is juxtaposed with the surface of the photoreceptor. A charge opposite in polarity to the charge on the toner is placed on the backside of the print paper by transfer charge generator 15 such that when the paper is stripped from the surface of the photoreceptor, toner is attracted to the paper and leaves the surface of photoreceptor 10. Any remaining residual toner is cleaned from the photoreceptor at cleaning station 16' by cleaning apparatus 16.

The selective application of light rays to the photoreceptor 10 at imaging station 13' is accomplished through printhead modulator means 17. For a semiconductor laser diode, the printhead 13 includes a power supply which is responsive to the modulator to either turn the light source on for longer or shorter periods of time to accomplish varying degrees of photoreceptor discharge in accordance with the pattern data, or it will turn the light-generating source on to a greater, or lesser, illumination intensity in accordance with that data. In any event, modulation will occur in accordance with that data contained in memory 18.

A toner patch control unit 19 is placed near the photoconductor 10 subsequent to developing station 14' in the direction of rotation. Unit 19 senses when toner mass developed is not at a correct level, and thereby enables corrective action to take place. For example, control unit 20 could take corrective action by calling for an adjustment of the charge level produced on the photoconductor by charge generator 12. It could call for an adjustment of the illumination produced on the photoconductor at imaging station 13', it could call for an adjustment of the developer bias voltage, or it could call for altering the replenishment of the toner supply. In some machines, a combination of these controls are used (i.e., an adjustment of charge level to obtain an immediate short-term correction of toner density developed while initiating a change in toner replenishment as a longer-term correction by activation of replenisher device 21 to add toner to the developer 14).

Central control unit 20 essentially consists of a microprocessor and memory and controls the operations of the machine Display 8 and keyboard 9 afford means through which the machine operator can interact with control unit 20. Thus, if desired, the control over toner mass developed can be adjusted through keyboard 9. Similarly, other machine parameters may be changed through keyboard 9.

An electrostatic probe 22 is placed near the photoconductor 10 subsequent to imaging station 13'. Probe 22 may be used to sense various voltage levels on the photoconductor including the white voltage level. For example, in a CAD machine, the photoconductor 10 may be charged to a level of 800 volts at charging station 12' and the background area may be discharged at imaging station 13' to a level of 200 volts. Probe 22 can be used to sense the level to which the photoconductor is charged at charging station 12', and also can be used to sense the level of the white voltage which is the discharged level resultant from illumination at imaging station 13'. Should either of these values be different from the desired value, central control unit 20 can take corrective action. For example, if the discharged area voltage is outside of the tolerance values around 200 volts, the level of illumination intensity developed by printhead 13 can be changed, up or down, to achieve the proper white voltage. Control of this type is especially important for photoconductors that exhibit significant sensitivity degradation with use.

In the practice of the instant invention, it is desired to control the location of the edges of images without affecting the machine control present for white voltage, dark voltage, toner density and other machine parameters. To do that, this invention involves control of illumination intensity from printhead 13 for edge PELS independent of control of illumination intensity for producing good white areas and good black areas. That is to say, regardless of how illumination intensity needs to change to produce the required white or black voltages, those changes will not be affected by the instant invention, and neither will those changes affect the edges of image areas.

Exposure (that is, discharge energy delivered by the printhead to the photoconductor) falls into two categories. First, the exposure level used to discharge the photoconductor to satisfy electrophotographic (EP) area development requirements, defines the basic EP operating point on the photoinduced discharge curve. Background white areas are created at that exposure level. Second, there is the exposure level used to create edge picture elements. Edge PEL exposure control enables image edge placement control This invention provides both positive and negative edge placement control.

In a specific implementation for a CAD process, control unit 20 sends three bits of data to the printhead 13 to specify operation of the printhead, which may be a laser, for example, at any one of eight power levels. The selectable power levels are zero(which does not discharge the photoconductor), the full discharge power level set by the printhead input, and six power levels in between. The six in between power levels are set percentages of a full discharge power level. Any of the power levels (except zero) may be chosen to produce the desired white voltage. In the application of this invention, it is desirable to initially select one of the intermediate power levels, e.g., intermediate power level number 3. This power level is then adjusted to produce the desired white voltage. Intermediate power level number 2 and number 1, which are less than power level number 3, are now available to extend the image edge location, that is, move it toward the white area, while intermediate power levels 4, 5 and 6, together with the full discharge laser power level, are available to contract the edge placement location, that is, move it toward the image area. In this manner, edge placement location may be controlled both positively and negatively.

Figure 2:
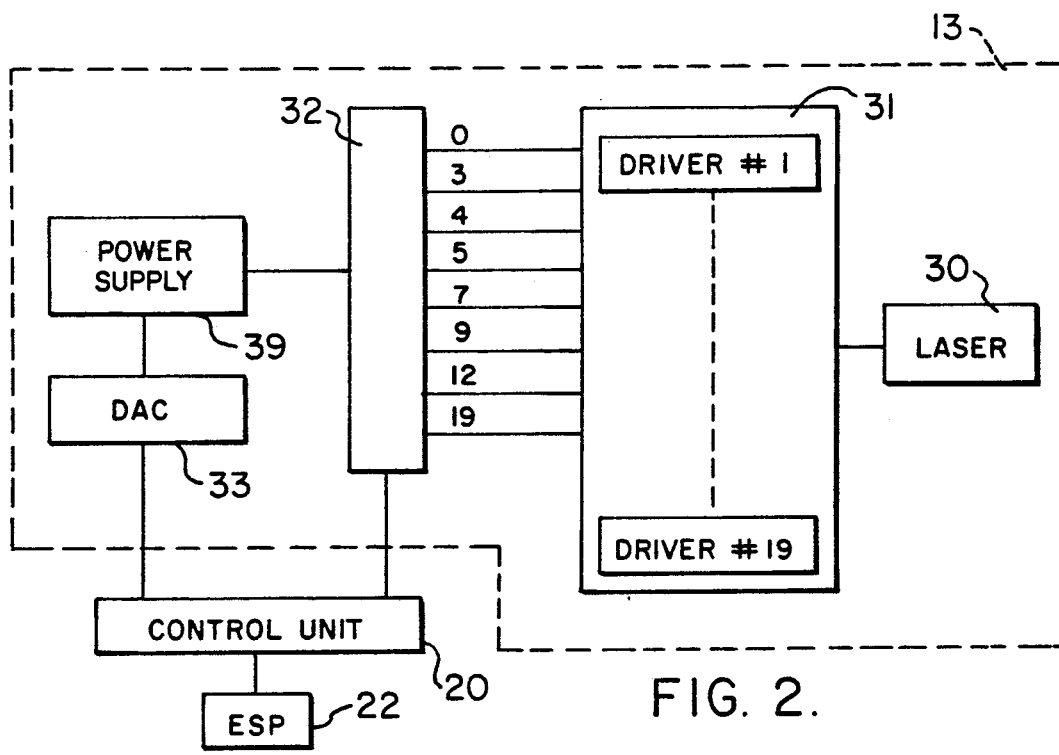
FIG. 2 is a diagrammatic representation of a control system for implementing the instant invention in the machine of FIG. 1.

FIG. 2 shows a laser light source 30 connected to 19 separate variable current drivers 31. The drivers are connected in parallel, and all supply current to the laser 30 to cumulatively add to the current supplied to laser 30. Selector switch 32 diagrammatically indicates the eight power levels for a selection of the number of drivers utilized at each power level. In the implementation shown, the three control bits sent to the printhead 13 from control unit 20 set switch 32 with 000 selecting zero drivers; 001 selecting three of the 19 drivers; 010 selecting four; 011 selecting five; 100 selecting seven; 101 selecting nine; 110 selecting 12; and 111 selecting all 19 drivers. If nine of the drivers are selected as the intermediate level for white laser power, then the edge laser power can be established above and below the number of drivers used for producing white voltage. This is accomplished through switch 32 under the control of control unit 20.

Note also that power supply 39 is controlled by digital-to-analog converter (DAC) 33. Thus, the control unit 20 can alter the output of power supply 39 and thereby alter full and fractional exposure intensity by placing a different number in DAC 33. In that manner, exposure intensity can be altered without changing the number of drivers selected by switch 32.

With reference to FIG. 3, the number of drivers for producing white PELS may be initially selected as nine, as noted above. Electrostatic probe 22 (FIG. 1) is used to sense the white voltage level. With new photoconductor, the white voltage level may be produced at a power level represented by the number 47 or less. That number, multiplied by the ratio of the total number of drivers to the number of rivers selected, for example, 19/9, is then used to drive the digital-to-analog converter 33 to establish that amount of power which power supply 39 will generate to energize the nine variable current drivers 31. Electrostatic probe 22 is periodically checked after production of an aribitrary number of prints, e.g., it may be checked after every 120 prints to determine whether white voltage level has changed from the desired level, 200 volts. As the photoconductor ages, or other environmental factors take effect, it will become necessary to change the white power level 34. Such changes cause the current supplied from the nine drivers to vary from an initial level to a maximum level. FIG. 3 shows that as the white power level increases, the number of edge drivers is decreased from a maximum to a minimum, thus altering the exposure of edge PELS from greater than white PEL exposure to less than white PEL exposure. FIG. 3 shows that when the white power level is 47 or below, the edge power will use 19 of the 19 drivers and the edge power will equal 19/9 times the white laser power. When the white power level is 48–75, the edge power will be produced by using 12 of the 19 drivers and the edge laser power will equal 12/9 times the white laser power. This information is empirically determined and then placed in memory within control unit 20. Thus, an inspection of the white power level 34, within control unit 20, automatically results in the establishment of the number of drivers used for producing edge power. Note that with nine drivers selected for producing white voltage, the highest level attainable is 9/19 of maximum power (255). In this implementation, it is desirable to switch to a second number of drivers for producing white voltage to extend the life of the photoconductor by allowing the white exposure level to go to the maximum of 255. Thus, a switch may be made from nine to 19 drivers at power level 100.

Should it be desired to produce print which is somewhat less bold than is currently being produced, the edge power level 36 can be altered to produce that change. For example, instead of using 100 as the maximum limit for edge power level, the operator can change that value to a higher number through the keyboard 9. In that way, edge power is increased, thus increasing the illumination on edge PELS, thus altering the image edge to make it less bold. Should one wish to increase boldness from the 100 setting, the edge power level can be changed to a lower number, for example, 90, thus providing less illumination on edge PELS and creating additional boldness.

In a second implementation of the invention, as shown in FIG. 4, the white voltage is produced from three out of the 19 drivers through all 19 drivers.

In FIG. 4, note that the white voltage is set at 200 volts. The electrostatic probe 22 senses the actual value of white voltage and should it be different from 200 volts, the white power level 41 and perhaps the number of white drivers 40 will be changed to bring the white voltage level to its correct setting, i.e., 200 volts. For new photoconductor, the white current is produced from three out of the 19 drivers. The white power level is allowed to vary from 25 to 33, the particular level being a result of a check made every 120 prints by the electrostatic probe 22. As the photoconductor ages, the white power level 41 is gradually increased.

As the white power level 41 increases from 33 to 34, the number of drivers used for producing the 200 volt white voltage is shifted from three to fur and retained at four as the white power level is gradually increased from 34 to 44. In order to get a smooth increase in white power when the change is made from three to four drivers, the power level 33 produces maximum current with three drivers, while power level 34 produces minimum current from the four drivers. The result is an appropriate increment in white power in going from power level 33 to power level 34.

As the white power level changes to 45, the number of drivers is increased to five, and the process is continued to keep white voltage at 200 volts by increasing white power as the sensitivity of the photoconductor degrades. Note that when the number of drivers is changed, the new edge power level is the ratio of the number of drivers before the change to the number of drivers after the change times the previous edge power level. Therefore, when a switch is made from three drivers to four drivers, the new edge power level is $\frac{3}{4}(100)=75$, as shown in FIG. 4. Note also, that if a switch is made from four drivers to three drivers, the new edge power level is $4/3(75)=100$. Photoconductor sensitivity can, at times, increase due to environmental conditions, such as ambient temperature and, therefore, the control system is designed to change edge power level in both directions.

FIG. 4 illustrates that regardless of the white power, the edge power level 43 is held fairly constant in a narrow range. Thus, as the photoconductor becomes less sensitive during its life, the fairly constant edge power level provides a steadily decreasing exposure effect at the edge PELS. When photoconductor is highly sensitive, a setting of three drivers is used for producing white voltage and the edge PELS are driven harder than are the neighboring white PELS, thus providing a super-white edge PEL. Thus, the edge of the charged area is moved back from where it would have been had the edge PELS been exposed at white power levels. As the sensitivity of the photoconductor decreases with age, the white power is increased until it is considerably beyond that power utilized on the edge PELS. Thus, the fairly constant edge PEL exposure allows the image area to extend beyond that location it would have had had the edge PELS been kept at white power. In that manner, the edge location of the image is kept constant, despite large changes in photoconductor sensitivity.

Figure 5:
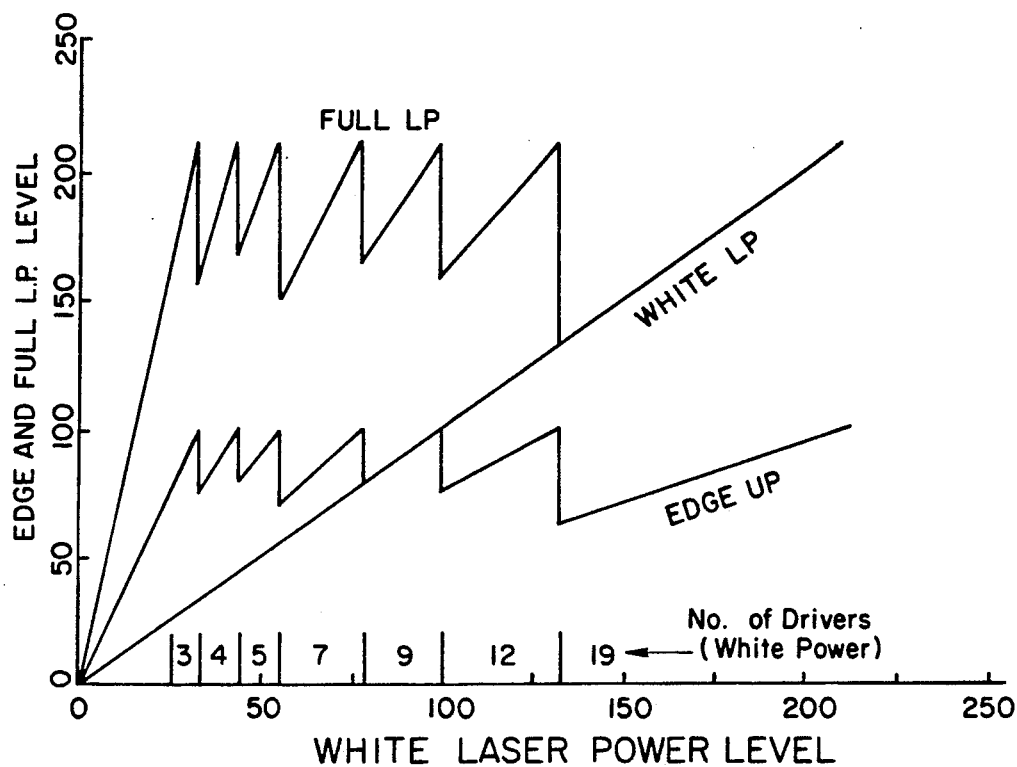
FIG. 5 is a graphical representation of FIG. 4.

The results of the table of FIG. 4 and the control implemented through that table by the control unit 20, are shown in graphical form in FIG. 5. The edge laser power level is held fairly constant, while the white laser power level is allowed to change independently. Note that the edge laser power level, regardless of the number of drivers used, is a fixed percentage of the full laser power level (all 19 drivers).

Figure 6:
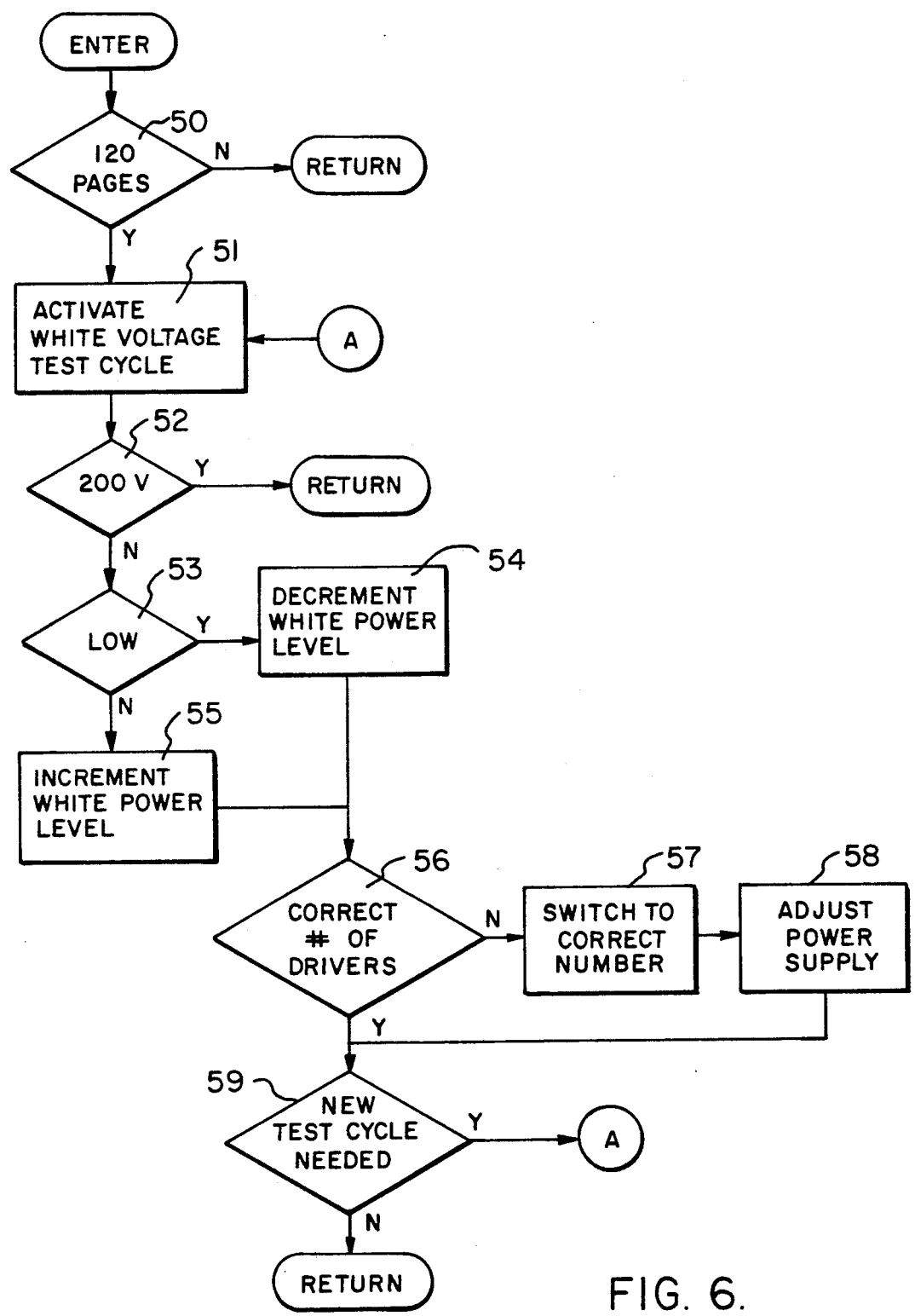

FIG. 6 illustrates the activities of the control unit 20 in servoing the white voltage to the correct voltage level. The white voltage is servoed when the machine is first turned on, and is also servoed every 120 pages during the production day. As shown in FIG. 6, at step 50, if it has been 120 pages since the last servo cycle, a new white voltage test cycle is activated at step 51. In the white voltage test cycle, the photoconductor 10 is charged at charging station 12' and is discharged to the white voltage level at station 13'. Electrostatic probe 22 checks the white voltage level and passes that information to the control unit 20. At step 52, if the white voltage level is within the allowed tolerance around the chosen white voltage level (in this case, 200 volts), return is made for a continuation of print production runs. If the voltage level is now within tolerance, a check is made at step 53 to determine if it is to low. If so, the white power level is decremented, step 54. If the white voltage level is too high, the white power level is incremented at step 55.

As shown in table of FIG. 4, specific white power levels 41 are associated with particular numbers of drivers 40. Thus, if the white power level is between zero and ten, the number of drivers for white voltage is established at three. In FIG. 6, at step 56, the new white power level number is inspected to determine if the correct number of drivers is in use. If not, a switch is made to the correct number of drivers at step 57 and the power supply 39 is adjusted by sending a new value to DAC 33 at step 58. A query is made at step 59 to determine whether a new white voltage test cycle is needed. The determining factor at step 59 is the amount that the white voltage varied from 200 volts. If the variation was small, a return is made for production print jobs. If the variation exceeded a specified level, then a new servo cycle is run to determine how close to the desired 200 volts the new white power levels have brought the machine.

Figure 7:
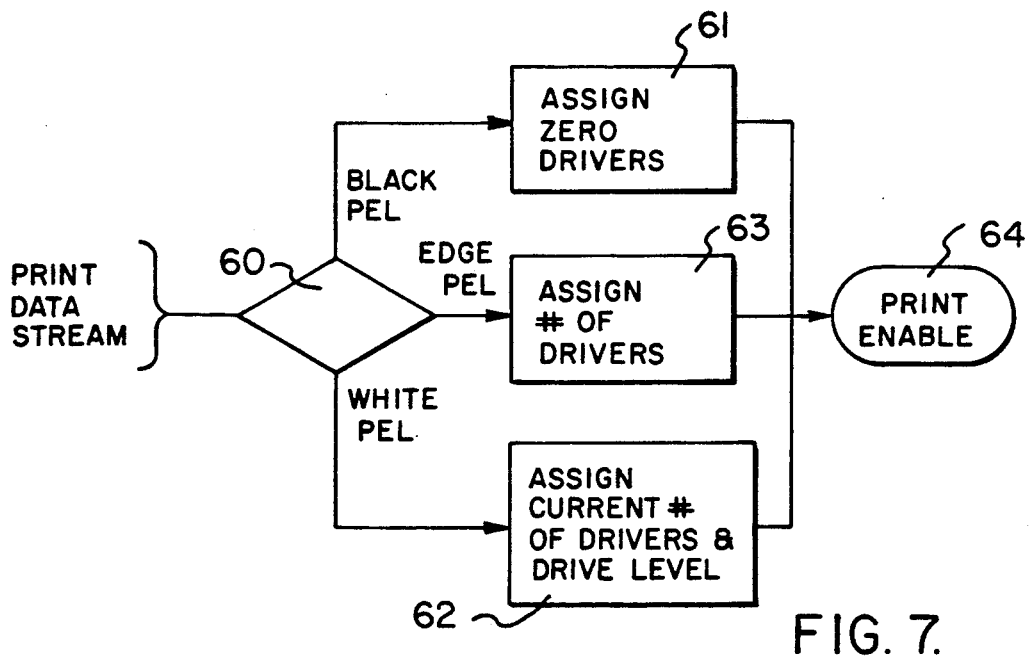
FIGS. 6 and 7 are logic flowcharts of the control process in accordance with the implementation shown in the table of FIG. 4.

FIG. 7 illustrates the activities in the control unit during the time that the production run is being made. The print data stream is serialized as it exits the printhead modulator 17 and is analyzed to determine whether the PEL to be printed is black, white or at a transition between black and white (i.e., an edge PEL). That activity is carried out at step 60 and if a black PEL is ascertained, at step 61 the control unit assigns zero drivers for the printing of that PEL. That is to say, in a CAD system, the light source will be turned off during that black PEL time.

If a white PEL is ascertained at step 60, the current drive level is assigned in accordance with the content in the white power level register established at step 54 or step 55, and the content of the driver number register established at step 57.

If an edge PEL is ascertained at step 60, an assignment is made of the number of drivers currently being used for edge PELS at step 63. With the correct number of drivers and drive levels assigned for that particular PEL, the print process is enabled at step 64. It should be noted that the process can be easily extended to accommodate special circumstances. For example, in some machines it may be desirable to assign a special number of edge PEL drivers for single PEL lines and single PEL dots in order to better preserve edge location. Also, if smoothing algorithms are in use on a specific machine, a specific number of drivers may be used for producing smoothing PELS and that number may be a fixed ratio of the number of drivers used for producing edge PELS.

While two particular implementations of the current invention have been illustrated, it is clear that several other implementations or combinations of implementations can be developed from application of the principals described herein. For example, in FIG. 4, the edge power level 43 is illustrated as varying in a narrow range as the photoconductor ages and white power level is changed If separate drivers are included in the printhead solely for edge PELS, an edge power level can be established to provide a completely constant edge power level regardless of the activities surrounding the setting of the white power level. Further, that edge power level can be customized to produce exactly that edge location which is desired throughout the range of white power levels. That is, instead of a completely constant edge power level, the edge power level may be allowed to change in a programmed fashion to set the edge power at exactly that level needed to maintain edge location in a desired manner.

While the present invention has been described with reference to preferred embodiments thereof, it will be appreciated that those skilled in the art will, upon learning of the invention, visualize yet other embodiments that are within the spirit and scope of the invention. Thus, the invention is to be limited only by the claims hereof.

What is claimed is:

1. A system for controlling image edge location on a photoconductor in an electrophotographic printing machine comprising:
   printhead means including light source means for producing illumination of variable intensity, said printhead means for receiving a data stream to be printed and controlling said light source means to produce picture elements or PELS on said photoconductor which range from a level considered to be fully discharged to levels which are charged in accordance with said data stream;
   means for identifying data which will produce edge PELS; and
   control unit means for interacting with said means for identifying edge PELS and said printhead means to control the illumination intensity of said light source means to produce edge PELS which range from a discharged level greater than that level considered to be fully discharged, to a discharged level less than the fully discharged level thereby controlling image edge location.

2. The system of claim 1 wherein said printhead means further includes driver means for supplying power to said light source; and
   power level control means connected to said driver means for altering the power supplied to said light source, said control unit means interacting with said power level control means to produce edge PELS with a desired illumination intensity ranging from greater than that intensity used for fully discharged PELS to an intensity less than fully discharged PEL intensity.

3. The system of claim 1 further including drive means for supplying power to said light source; and switch means for changing the number of drivers supplying current to said light source, said control unit means for assigning the number of drivers to be used for the production of fully discharged PELS and the number of drivers to be used for producing edge PELS.

4. The system of claim 3 wherein said control unit assigns the number of driver for producing edge PELS to a number both above and below the number of drivers for said fully discharged PELS, the edge PEL assignment changing in accordance with a table contained in control unit memory.

5. The system of claim 3 wherein said control unit assigns the number of drivers to produce fully discharged PELS to a number that varies above and below the number assigned for producing edge PELS, the number for producing fully discharged PELS changing in accordance with the table contained in control unit memory.

6. The system, of claim 1 further including means for manually adjusting illumination intensity for edge PELS to slightly change edge location for less bold or more bold appearance.

7. The system of claim 1 further including:

means for sensing the fully discharged level on said photoconductor; and means for changing machine parameters to keep the correct fully discharged level on said photoconductor throughout machine life, and wherein said control unit means keys on said changes to machine parameters to alter the illumination intensity of said edge PELS whereby edge PEL charge level can be controlled in a desired manner in accordance with changes in photoconductor sensitivity.

8. The system of claim 7 further including means for manually adjusting illumination intensity for edge PELS to slightly change edge location for less bold or more bold appearance.

* * * * *